April 2, 1940.     H. V. PHELPS     2,195,874
HYDRAULIC BRAKE SYSTEM JACK OPERATOR
Filed June 10, 1939     2 Sheets-Sheet 1
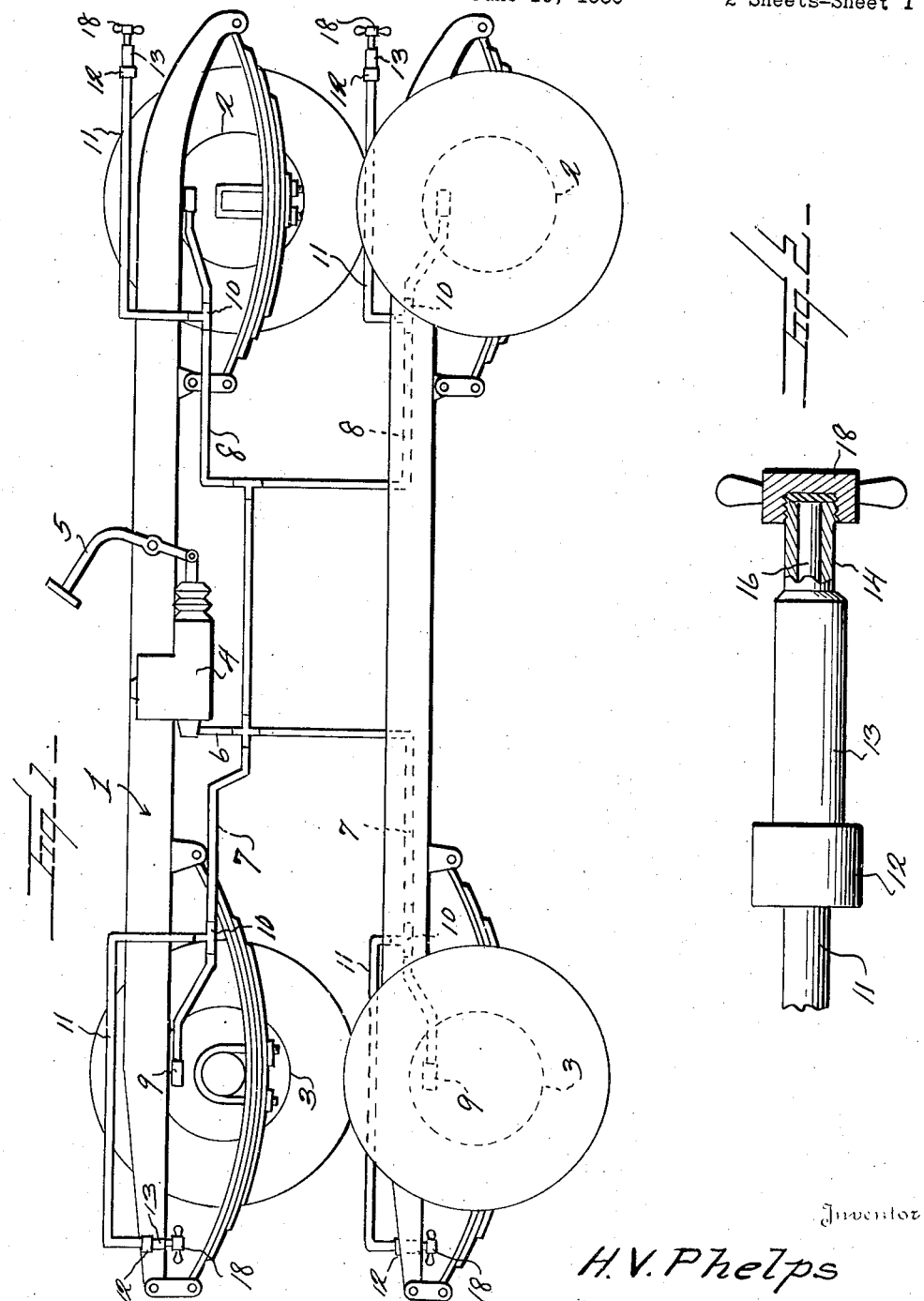
Inventor
H. V. Phelps
By Watson E. Coleman
Attorney April 2, 1940.  H. V. PHELPS  2,195,874
HYDRAULIC BRAKE SYSTEM JACK OPERATOR
Filed June 10, 1939  2 Sheets-Sheet 2
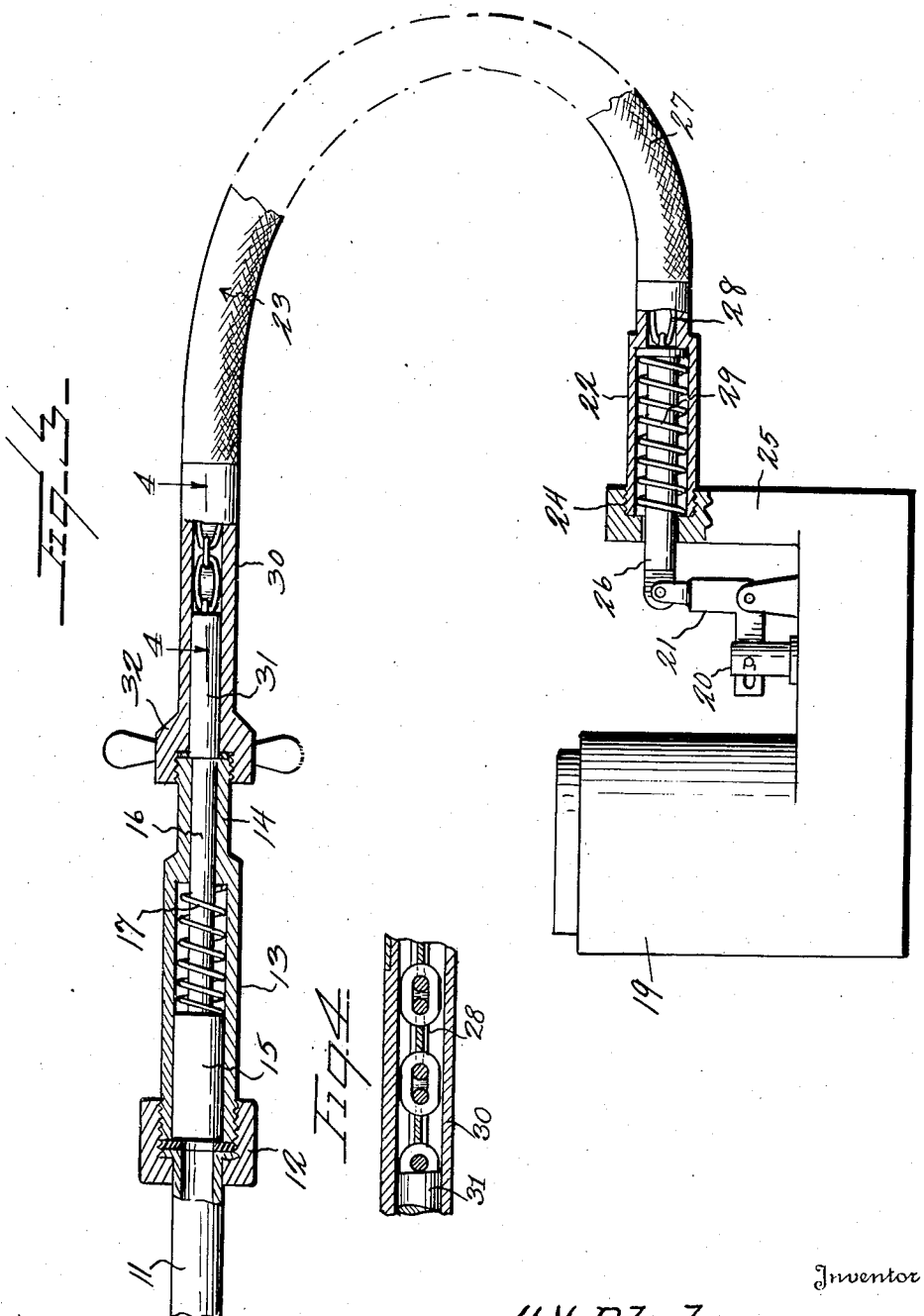
Inventor
H. V. Phelps
By Watson E. Coleman
Attorney Patented Apr. 2, 1940

2,195,874

UNITED STATES PATENT OFFICE 2,195,874

HYDRAULIC BRAKE SYSTEM JACK OPERATOR

Henry Vick Phelps, Nitta Yuma, Miss.

Application June 10, 1939, Serial No. 278,547

6 Claims. (Cl. 303—6)

This invention relates to operating means for hydraulic jacks and pertains particularly to a novel means of actuating a hydraulic jack from the hydraulic brake system of a motor vehicle.

The present invention has for its primary object to provide a novel mechanism by which a hydraulic jack may be conveniently coupled with the hydraulic brake mechanism of a motor vehicle whereby such jack may be actuated for the raising of a portion of the vehicle merely by operating the brake pedal of the brake system.

Another object of the invention is to provide in association with a hydraulic braking system for motor vehicles, a novel connector between the fluid lines of the brake system and a hydraulic jack whereby a jack may be easily coupled with the fluid line for actuation by the foot brake of the brake system and whereby during the time that the jack is not connected with the system the coupling means will not interfere in any respect with the operation of the braking mechanism or alter its efficiency.

A further and more specific object of the invention is to provide a novel reciprocating actuator for a hydraulic brake which includes a fluid operated piston which forms a permanent part of the hydraulic brake system and which, when the hydraulic jack is not connected therewith, is secured against movement so that the development of the proper fluid pressure in the brake system under normal operating conditions will not be interfered with.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a diagrammatic perspective view of a motor vehicle chassis showing a pneumatic brake system associated therewith and showing the manner of combining the present invention with such system.

Fig. 2 is a view in side elevation on an enlarged scale of one of the power units connected with the system.

Fig. 3 is a view illustrating the connection of a power unit with the power transmitting cable and a hydraulic jack.

Fig. 4 is a sectional view on an enlarged scale taken on the line 4—4 of Fig. 3.

Referring now more specifically to the drawings, the numeral 1 generally designates a motor vehicle chassis, the front wheel brakes associated therewith being indicated generally by the numeral 2 while the rear wheel brakes are indicated by the numeral 3. Associated with this chassis structure there is shown a conventional fluid brake system which comprises the master cylinder unit 4 and the foot lever 5 which is connected therewith. The outlet for the master cylinder is indicated at 6 and leading from this outlet to the rear brakes are the individual fluid lines 7 and leading to the front brakes 2 are the individual lines 8 which are also connected with the outlet 6. These front and rear fluid lines connect with the usual brake operating units 9, the construction and operation of which are well known.

In carrying out the present invention each of the four distributing lines 7—7 and 8—8 is provided with a three-way union 10. Each of the unions 10 has connected therewith an end of a branch fluid line 11 which branch line is preferably secured to the vehicle chassis and extends toward the adjacent end thereof where its other end will be conveniently accessible when it is desired to couple a jack with the system for the jacking up of the adjacent wheel of the chassis structure.

The other end of each fluid branch line 11 has connected therewith by means of a suitable coupling 12, an end of a cylinder 13, the other or outer end of which cylinder is of interiorly reduced diameter as indicated at 14. Within the cylinder 13 is a piston 15 which is provided with the elongated plunger 16 which extends from one end and through the reduced outer end portion 14 of the cylinder. Between the inner end of the piston 15 and the end of the cylinder at the reduced portion 14 there is an expansion spring 17 which surrounds the plunger 16 and which normally urges the piston 15 toward the discharge end of the pipe line 11.

The outer end of the reduced portion of the cylinder is normally closed by a cap 18 which prevents the extension of the plunger 16 when pressure is established in the adjacent line 11 during the normal operation of the brake system, thereby preventing the fluid operated unit which includes the cylinder and the piston 15, from reducing the efficiency of the braking system.

The numeral 19 generally designates a hydraulic jack having an operating plunger 20 which is connected with a suitable rock arm or rock lever 21 which is in the form of a bell crank and by which reciprocatory motion is transmitted to the jack plunger for the operation of the jack. No detailed showing of the jack structure has been made as such jacks are of standard design and well known, the only alteration which is necessary to make in the jack structure is to provide a suitable means for connecting with the body of the jack, an end of a spring housing or shell 22 which has its other end coupled with a flexible cable which is indicated generally by the numeral 23. The shell 22 is here shown as having an end threaded in a suitable recess 24 in a part of the jack body, which recess is alined with a passage 25 through which extends a reciprocable operating stem 26, one end of which is pivotally connected with an arm of the bell crank lever 21.

The flexible cable 23 consists of a sheath 27 and an interior flexible reciprocable articulated strand 28, an end of which is connected with the stem 26 as shown. A spring 29 enclosed within the housing or shell 22 is connected at one end with the stem 26 and normally operates to retract the stem so that the jack plunger 20 will be raised or retracted. This spring also serves to shift the strand 28 of the cable through its sheath 27.

The opposite end of the sheath 27 of the cable 23 is connected with a cylindrical tube or guide 30 into which the other end of the strand 28 extends and this other end is connected with a pin 31 which is reciprocable in the guide 30. The guide 30 also carries a swivel coupling 32 by which it may be connected in end alined relation with the outer end of the reduced portion 14 of a cylinder 13, thus bringing the free end of the pin 31 into position against the free end of the plunger 16 of the cylinder with which it is joined.

From the foregoing description, it will be readily apparent that when the hydraulic jack is to be put into operation for the lifting of any one of the four wheels of the vehicle chassis, the first operation necessary is to remove the cap 18 from that cylinder 13 which is nearest the wheel to be raised and to then couple with the cylinder, by means of the swivel connection 32, the guide 30 of the power transmitting cable 23 which is connected at its other end with the jack. After this connection has been made, the jack may be placed in the proper position beneath the chassis and the necessary power may be transmitted to the plunger 20 thereof by the repeated operation of the brake lever 5. Each time the brake lever is depressed, fluid pressure will be established in the line 11 with which the guide of the power transmitting cable is connected to eject the piston 15 and the plunger 16 thereof so as to transmit longitudinal movement to the cable strand 28. This movement will be transmitted to the bell crank 21 of the jack so as to operate the jack plunger.

While there have been illustrated and described four separate fluid pressure take-off lines 11, it will be understood that there may be provided only a single one of these lines if desired, in which case the power transmitting cable 23 would be of sufficient length to permit the jack with which it is connected to be located adjacent any one of the four wheels of the vehicle after the proper connection has been made between the other end of the cable and the power transmitting unit which forms the terminus of the pressure line.

From the foregoing, it will be readily apparent that there has been here disclosed novel means of coupling a hydraulic jack with the fluid brake system of a vehicle and that with this mechanism the lifting of the vehicle at the desired end and side may be easily accomplished. It will also be apparent that by carrying the ends of the fluid pressure take-off lines 11 to the outer ends of the chassis frame, the connection of the power transmitting cable with the pressure line may be accomplished conveniently and without the possibility of the operator soiling his hands or clothing.

What is claimed is:

1. Jack operating means for a motor vehicle having a fluid brake system, comprising a fluid pressure take-off line connected at one end with said system, a reciprocable plunger connected to the other end of said line to be actuated by fluid pressure established therein, means for securing said plunger against movement during the normal operation of the braking system and a flexible power transmitting cable having one end connected with said jack and having the other end adapted for connection with said plunger when said last means has been removed, said power transmitting cable including a reciprocable portion adapted to be shifted for the actuation of the jack by said plunger when fluid pressure is set up in the said line.

2. Operating means for a jack adapted to be used in association with a vehicle having a fluid brake system, comprising a reciprocable flexible power transmitting cable having an end operatively connected with said jack for the actuation of the latter, the other end of said cable carrying a reciprocable plunger pin, a fluid pressure line connected at one end with said braking system, a cylinder at the other end of said line, a piston reciprocably mounted in the cylinder to be shifted therein by fluid pressure established in the line, means for coupling the said other end of said flexible cable with said cylinder whereby said pin will be alined therewith, and a plunger carried by the piston for end contact with said reciprocable pin for the transmission of longitudinal movement to the pin upon movement of the piston in one direction.

3. In a motor vehicle fluid brake system, means for coupling a hydraulic jack with the system, which jack is provided with a reciprocable plunger, comprising a piston cylinder supported on the vehicle, a piston reciprocably mounted in the cylinder, means connecting one end of the cylinder with the fluid brake line for the reception of fluid pressure therefrom, a plunger carried by the piston for projection through the other end of the cylinder, resilient means in the cylinder normally urging the piston in a direction to retract the plunger into the cylinder, a power transmitting cable including a reciprocable encased strand, said strand being connected at one end with the jack operating plunger, a pin connected with the other end of said strand and supported for reciprocable movement, and means for securing the said cable to the said other end of the cylinder to support said pin and said plunger in end to end alined relation whereby longitudinal movement may be transmitted from the plunger to said strand.

4. A hydraulic jack operator in which said jack has a reciprocable operating plunger, comprising a fluid pressure line, means for establishing pressure in said line, a cylinder connected at one end with an end of the line, a piston in the cylinder, a plunger connected with the piston and extensible through an end of the cylinder, spring means in the cylinder engaging the piston for retracting the plunger into the cylinder, a flexible power transmitting cable including a sheath and a flexible strand housed therein, means connecting one end of the sheath with the jack, a plunger connecting an end of the strand with the jack plunger, a tubular guide connected with the other end of the sheath, means for detachably coupling the end of the guide with the end of the cylinder through which the piston plunger is ejected, a reciprocable pin in said guide connected with said strand and having an end abutting the outer end of the piston plunger, and resilient means normally urging the movement of said strand in the sheath in opposition to the piston plunger.

5. In a vehicle hydraulic braking system including fluid lines leading to the vehicle brakes, a fluid pressure take-off line connected with each of said first lines and extending adjacent to each of the vehicle wheels toward the adjacent end of the vehicle, each of said take-off lines terminating in a cylinder, a piston in each of said cylinders, resilient means in each cylinder normally urging the movement of the piston toward the adjacent line, a plunger connected with each piston for projection through an end of the cylinder, and a cap detachably secured over the said end of each cylinder to prevent the projection of the plunger therefrom when pressure is established in the braking system during normal operation of the same, said caps being removable to facilitate the attachment to the cylinders of a reciprocable jack operator adapted to be actuated by the piston plunger on ejection from the cylinder.

6. In a motor vehicle having a fluid brake system, a jack operating means comprising a fluid pressure take-off line connected at one end with said system, a fluid pressure actuated shiftable element in the other end of said line, means for securing said element against movement during the normal operation of the braking system, said element being shiftable by fluid pressure established in the system when said element is released by the securing means, and means for establishing an operative connection between the jack and the said fluid actuated element whereby upon actuation of said element a transmission of power therefrom to the jack will be effected for the actuation of the latter.

HENRY VICK PHELPS.